United States Patent [19]

Ewing

[11] Patent Number: 4,522,058
[45] Date of Patent: Jun. 11, 1985

[54] LAMINAR-FLOW CHANNELING IN THERMAL FLOWMETERS AND THE LIKE

[75] Inventor: James H. Ewing, Brockton, Mass.

[73] Assignee: MKS Instruments, Inc., Burlington, Mass.

[21] Appl. No.: 504,530

[22] Filed: Jun. 15, 1983

[51] Int. Cl.[3] .............................................. G01F 5/00
[52] U.S. Cl. ...................................... 73/202; 138/44; 138/108
[58] Field of Search ................. 73/202; 138/40, 42, 138/44, 108

[56] References Cited

U.S. PATENT DOCUMENTS

| Re. 31,570 | 5/1984 | Drexel | 138/42 |
|---|---|---|---|
| 2,069,630 | 2/1937 | Steenstrup | 138/42 |
| 2,586,060 | 2/1952 | Kronberger | 73/202 |
| 2,688,985 | 9/1954 | Holdenried | 138/44 |
| 3,071,160 | 1/1963 | Weichbrod | 138/40 |
| 3,349,619 | 10/1967 | Millar | 138/44 |
| 3,559,482 | 2/1971 | Baker et al. | 73/202 |

*Primary Examiner*—Herbert Goldstein
*Attorney, Agent, or Firm*—James E. Mrose

[57] ABSTRACT

In a compact thermal flowmeter unit of the type wherein a portion of the fluid in a main flow path is shunted through a laminar-flow sensor passageway, that section of the main flow path which the sensor bypasses is occupied by an appropriate range-governing cartridge selected from among a family of externally-similar tubular flow-regulating cartridges each having a different flow capacity as determined by the totals of cross-sectional areas of its plurality of linear flow channels each exhibiting an effective ratio of length to cross-section which promotes laminar flow but is nevertheless advantageously relatively short. Such tubular cartridges are conveniently inserted into and removed from threaded fastening within the unit by way of one end thereof where there is an accommodating removable end fitting; not only may changes in measurement ranges be effected readily by substituting different cartridges, but the cartridges may also be removed, easily purged clean of possible contaminants and obstructions, and replaced simply and with little effort, skill or delay. Although each intricate cartridge is essentially a precision element, its critical multiple laminar-flow channels are uniquely produced conveniently and economically with the aid of a few common uniform-diameter wires extending linearly in a special press-fit relationship between a tubular casing and a coaxial core member.

5 Claims, 7 Drawing Figures

LAMINAR-FLOW CHANNELING IN THERMAL FLOWMETERS AND THE LIKE

BACKGROUND OF THE INVENTION

The present invention relates to improvements in fluid-flow mechanisms which promote laminar-flow conditions, and, in one particular aspect, to novel and advantageous compact cartridge-type flow regulators of precision yet economical construction which are distinctively adapted for insertion into and withdrawal from the main flow path of a flowmeter having a sensor in shunt relationship, for measurement-range control and for occasional purging.

Volumetric and mass flowmetering equipment has evolved into a wide variety of forms and sizes, applying numerous different principles of operation, and functioning to accommodate fluent materials whose densities, flow rates, viscosities and compositions may be quite dissimilar. Among these are classes of sensitive and rapid-response accurate flowmeters of the so-called "hot wire" type, which are particularly useful in respect of measurements of gaseous-fluid flow, and which exploit the phenomenon that a flowing fluid encountering a mass at a higher temperature tends to cool it to an extent which at least in part depends upon the rate of flow. For example, it has been known to introduce an electrical heater into a stream, and to maintain its supply of electrical power essentially constant while interpreting the differences between upstream and downstream temperatures as measurements of flow; similarly, mass flow has been metered by determining the temperature differentials between temperature-sensitive heating coils which are in upstream and downstream relations to the flowing fluid and which are elements of electrical bridge circuitry serving both measuring and heating purposes. Accurate measurements are obtainable in the latter types of flowmeters only if essentially laminar flow conditions are preserved, and it has therefore been a common practice to conduct the bypass flow through a rather highly elongated slender sensor tube and to exchange heat with the flowing fluid externally through thin walls of the tube without interposing obstructions internally (U.S. Pat. Nos. 3,433,068 and 3,613,448 and 3,851,526 and 3,938,384). The bypass of flow-splitting technique allows one such sensor tube, with its associated heaters and temperature detectors, to develop reliable measurements over a multitude of flow ranges, provided the main flow path which it shunts is also one in which laminar flow conditions are preserved, regardless of the extent to which flow is restricted in that main path. Because laminar flow conditions do not obtain unless each constricted flow path has an effective length-to-diameter ratio of at least about one hundred, the range-governing restrictors employed in the main flow path would be of inconvenient lengths unless their flow openings were convoluted into short spans (as in said U.S. Pat. No. 3,851,526) or were fashioned into minute-diameter channels; however, both such practices invite unwanted manufacturing difficulties and expense.

SUMMARY OF THE INVENTION

In accordance with certain aspects of the present teachings, it is recognized that flow-restricting mechanisms used for the accurate governing of measurement ranges in thermal flowmeters, or the like, may be uniquely fashioned with a plurality of linear and precisely-proportioned flow channels contained within short cartridge-like units which may readily be inserted into and withdrawn from a flow path, for purging or range-changing, and then repositioned, using no uncommon skills or tools. A preferred embodiment of the invention involves a compact cartridge fashioned from a tubular member, externally threaded at one end and slotted to mate there with a screwdriver-type tool, the smooth interior surfaces thereof being of uniform diameter. Coaxially within the tubular member is a solid core which has a uniform-diameter smooth exterior and is radially spaced from the surrounding tubular member by three symmetrically-arrayed straight lengths of common commercially-available wire, all of the same diameter. The inner diameter of the tubular member and outer diameter of its cooperating core are selected to form and maintain a secure fit with the lengths of wire trapped between them, and, in their assembly, the core with the wires arrayed somewhat loosely about it is first press-fitted into the tubular member from one end and excess is then trimmed. Wire diameter may typically be quite small, such that the radial clearance between the tubular member and core is correspondingly minute, and the cartridge length may thus be kept short because each of the three open channels through it has a large ratio of length to effective diameter. The cartridge is screw-threaded into position within the shunted main flow path of a thermal flowmeter, which path has a port openable at one end and on the interior has an internally-threaded bore shaped to receive the externally-threaded capsule.

Accordingly, it is one of the objects of the present invention to provide unique and advantageous flow-restriction channeling having high-precision cross-sections and laminar-flow parameters expressed in relatively short lengths of easily-purged capsules distinctively adapted for ready placement in and removal from fluid flow conduits where they may accurately regulate flow measurements being conducted in shunt paths.

It is a further object to provide for the convenient and low-cost manufacture of short laminar-flow flow-restriction units which are useful in determining the measurement ranges of shunt-type thermal flowmeters and the like, utilizing conventional sizes of wires which subdivide and establish the critical thicknesses of flow channels in main flow paths.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

DETAILED DESCRIPTION OF THE PREFERRED EMBODIMENTS

Figure 1:
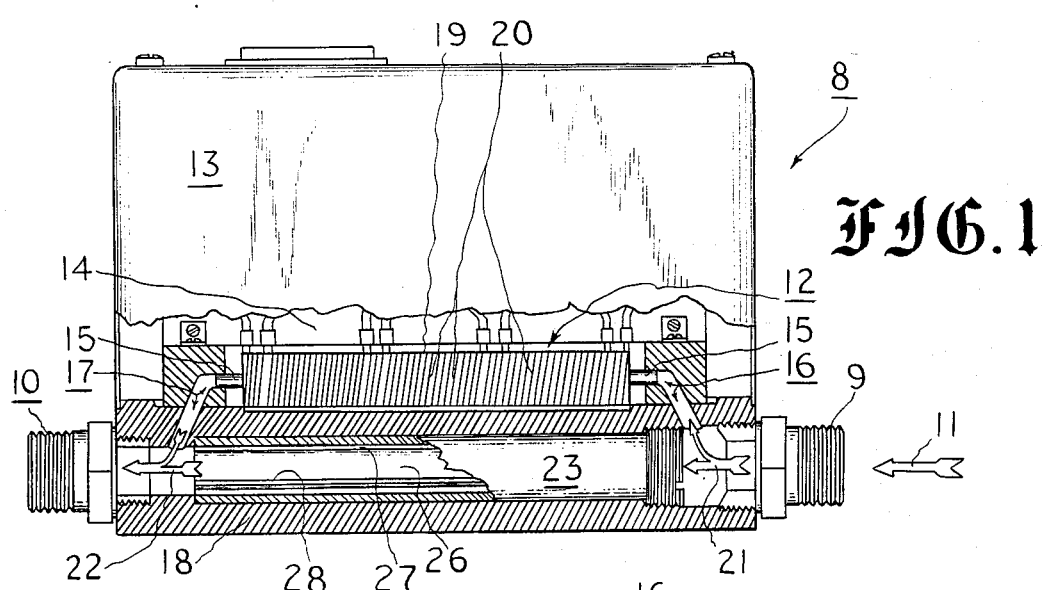
FIG. 1 illustrates, partly in cross-section, a flow transducer assembly in which an improved capsule-type flow-restriction unit in accordance with the present invention is fitted within the main flow path.

Having reference to the drawings, wherein like reference characters designate identical or corresponding components and units throughout the several illustrations, and, more particularly to FIG. 1 thereof, one embodiment of a thermal flowmetering arrangement, 8, is shown to include inlet and outlet port couplings 9 and 10, respectively, which conduct fluid flow, such as that of a gaseous substance involved in a controlled process, from right to left, as characterized by upstream arrow 11. The thermal mass flowmeter sensor arrangement 12 which is there housed within the cover 13, along with its printed-circuit electronic network 14, is disposed in a thin and elongated shunt or bypass path defined by a thin stainless steel tube 15 which has inlet and outlet flow paths 16 and 17, respectively, merging with upstream and downstream ends of an essentially straight main flow path running through a stainless steel base 18. Construction and mode of operation of the sensor arrangement 12 may be of other types well known in the art, but, preferably, they are as described in the copending U.S. patent application Ser. No. 06/397,109, which was filed in my name as co-inventor on July 12, 1982. According to one aspect of those practices, the thin flow tube 15 has three helical windings (not visible in the drawings) distributed sequentially along most of its span, each winding being of high-temperature-coefficient resistance wire and serving, respectively, to insure initially that the fluid arriving through upstream bypass channel 16 is brought to a first predetermined temperature, and that the fluid is next raised to a higher second temperature, and that there is a subsequent controlled cooling of the fluid to a temperature between the first and second temperatures before it exits via downstream bypass channel 17. Each of the three temperature-sensitive windings is preferably made part of an electrical bridge network which is virtually instantaneously balanced, automatically, via associated operational amplifier and power transistor circuitry, and it is not necessary to use separate heater and temperature-detection windings, although that may be done instead. In avoiding variations, and consequent error, which might otherwise attend wide variations in ambient temperature, a stabilized artificial environment for the sensor is created by surrounding it with an enclosure 19 carrying a heater winding 20.

Figure 2:
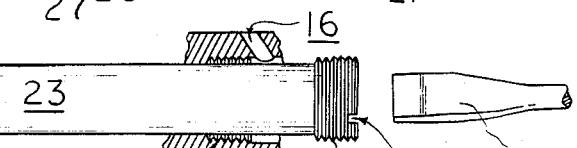
FIG. 2 provides a detail of the flow-restriction capsule unit of FIG. 1, in association with a mated portion of the transducer assembly, and in association with a screwdriver-type tool which may be employed to insert and remove it.

A flowmeter of such construction is capable of fast response in supplying information related directly to mass flow rate when not only the bypassing path but the shunted main flow path maintain laminar-flow conditions for the fluid. Such conditions can be achieved readily enough in the bypass through sensor tube 15, inasmuch as its length-to-diameter ratio can conveniently be made to exceed about one hundred even in an easy-to-manage short length of tubing; the fraction of fluid which must be bypassed, characterized by the split arrows 21 and 22, may be relatively small, and the tube 15 therefore need only have a relatively small bore as well. However, if the main flow path appearing in the base 18 between couplings 9 and 10 does not also maintain laminar flow for the fluid coursing through it, there may be turbulence and related measurement errors originating with variations in viscosity, temperature and pressure, for example. Yet, because the main flow path must ordinarily have a relatively large flow capacity, and related cross-section, its length would tend to be large and cumbersome when of laminar-flow proportioning. On the other hand, devices such as flowmeter 8 are preferably kept to small size and complexity, and long main flow paths are to be avoided. For the latter purposes, the base 18 of flowmeter 8 is fitted with a flow-restriction capsule 23 in which the main flow path is subdivided into three linearly-extending channels, each of which channels is given laminar-flow proportions. Such capsules are preferably easily purged or cleaned of contaminants which might deleteriously affect flow characteristics, and attendant measurements, and they are therefore made easily removable so that the small channels may be blown or ultrasonically cleared. Further, such capsules preferably offer a range of flow-restriction characteristics which will allow one flowmeter construction to perform measurements over different flow ranges, and the initial selection and/or later substitution of different capsules for different ranges of measurement is an important consideration. Accordingly, the capsule 23 is provided with an externally-threaded upstream-end enlargement, 23A, which mates within a complementary internally-threaded region 18A (FIG. 2) at the upstream end of a main-path bore in base 18. The upstream inlet port, and coupling 9 at that site, are made large enough to accommodate insertion and withdrawal of the capsule from that location, and the upstream end of the capsule is shaped, as by notching 24, to receive and be turned by a tool such as one having a screwdriver-shaped blade illustrated at 25 in FIG. 2.

Figure 3:
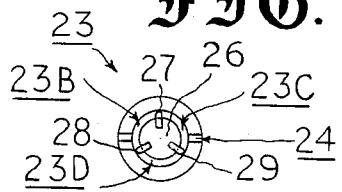
FIG. 3 is an upstream-end view of the flow restriction capsule unit of FIGS. 1 and 2.

The view toward the upstream end of capsule 23, appearing in FIG. 3, aids in understanding that its three linearly-extending flow channels, 23B and 23C and 23D, appear in the thin radial spaces between a smooth and uniform inner diameter of the outer cartridge tubular member and the smooth and uniform outer diameter of a solid core member 26 which is coaxial with the outer member over most of its length. Holding those two members in that radially-spaced relation, and angularly separating that space into the three channels, are three linearly-extending wires 27, 28 and 29, which are of small uniform diameter and are arrayed about 120° apart around the central longitudinal axis of the cartridge. The three wires are held fast by a press fit relationship with the inner and outer members, and they therefore preserve good angular partitioning and radial spacing without involving complex fastenings.

In fabricating the capsule 23, its outer tubular member is force-fitted with the core and wires, as portrayed in the FIG. 3 showing of core 26 being forced in the direction of arrow 30 while the three wires 27-29 are arrayed about it. As an aid to keeping the wires taut and straight, without slippage such as may be likely because of the press-fit relationships involved, the lower ends of the wires are first bent across the lower blunt end of the core 26 and spot-welded there in that out-of-the-way position and in the correct angular array, after which the core with wires attached in that fashion is driven into the downstream end of the outer capsule member. Excess wire and/or core material projecting from that end may be trimmed after the full tight mechanical fit has been achieved. The resulting flow channels 23B and 23C and 23D have relatively small effective diameters, such that, for only a relatively short-length capsule, those channels promote the desired laminar-flow conditions. It is not necessary that the channel cross-sections themselves be circular, although it is preferred that they be essentially regular and straight, as described, and thus easily cleaned and not likely to develop eddies and other turbulence effects.

A major factor in the economies and convenience of such fabrication of the capsules is found in the ready commercial availability of tubing, wires and rods in sizes, material and precise shaping which are especially well suited to that fabrication. By way of example, the wires 27-29 may have a standard wire diameter about 0.016 inch, making the radial gap for the channels about that same value and establishing a capsule length, for laminar-flow conditions, at about 2.3 inches in one design. Wire, tubing and rod may be obtained in multitudes of diameters, and with tolerances, allowing for selection and fit of parts to fashion a wide variety of short capsules having capacities accurately matched with needs for establishing various measurement ranges for a flowmeter. Typically, the interferences between pressed-together parts of the capsule may be of the order of 0.001 inch, for but a moderate press-fit condition.

Figure 4:
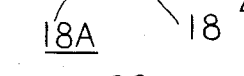
FIG. 4 is an upstream-end view of a capsule unit generally similar to that of FIG. 3 but with an additional wire separator and spacer.
Figure 5:
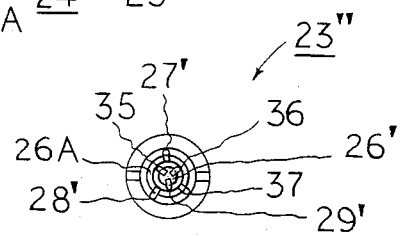
FIG. 5 is an upstream-end view of a capsule unit generally similar to that of FIG. 3 but with a further inner concentric array of laminar-flow channels.
Figure 6:
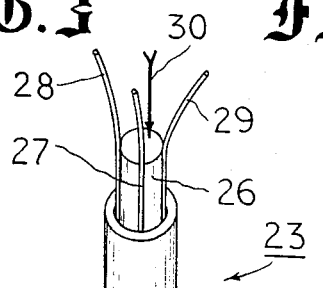
FIG. 6 is a pictorial view, with portions broken away, of a capsule unit such as that of FIGS. 1, 2 and 3 during assembly.
Figure 7:
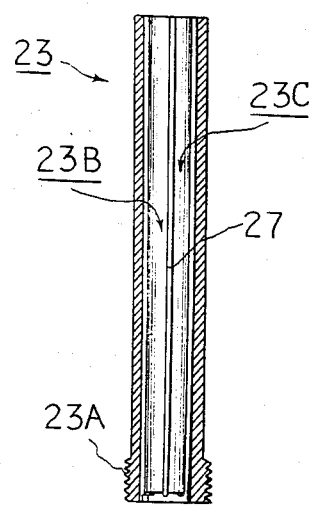
FIG. 7 is a longitudinal partial cross-section of the capsule unit of FIGS. 1, 2, 3 and 6.

A minimum of three wires is required to position the core 26 symmetrically within capsule 23, although, as is depicted in FIG. 4, there may be a fourth such wire, among wires 31-34 of the capsule 23', occasioning four laminar-flow channels. The number may be larger than that where the various dimensions involved will accommodate them and where they may be needed to subdivide the flow into more short channels of small effective diameter. Similarly, more than one concentric array of elements may be involved, as in capsule 23" of FIG. 5, where the three outer wires 27'-29' are arrayed about a hollow intermediate tube 26A and the latter surrounds three further wires 35-37 which are in turn arrayed about a solid inner core 26', to develop six laminar-flow channels. In other units, the wire-like elements may themselves be hollow, and/or various other structural elements such as tubes of suitable laminar-flow proportioning may be clustered together in a press-fit relation within the capsule, the assembly method being basically the same. Accordingly, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. In combination with a flowmeter having a main fluid flow path extending through a base and a flowmetering sensor associated with a laminar-flow path in shunt relation to a relatively short path of the main flow path, means for establishing laminar-flow conditions in the shunted part of the main fluid flow path, comprising a substantially straight tubular member disposed to fit within said shunted part of the main flow path, a plurality of elongated straight structural elements clustered together within said tubular member in a self-holding mechanically fitted relationship therewith and with one another which leaves a plurality of substantially straight and relatively small fluid flow channels therethrough, said elongated structural elements including a core member coaxial and substantially coextensive with said tubular member and further including a plurality of wire-form members fitted between said core member and tubular member to produce said relatively small fluid flow channels in separated spaces therebetween, said channels all having effective length-to-diameter ratios which promote laminar flow and extending substantially fully the length of said tubular member, and means for removably fastening the assembly of said tubular member and said elongated elements as a unit within said shunted part of the main fluid flow path.

2. In combination as set forth in claim 1, wherein said tubular member has a substantially uniform-diameter interior and said core member has a somewhat smaller substantially uniform-diameter exterior, said tubular member and core member being substantially concentric about a central longitudinal axis of the tubular member, and wherein the cluster of all of said structural elements firmly packs said tubular member and forms tight fits therebetween and with said tubular member resulting in a self-sustaining cartridge-like unit which does not come apart in normal use within said main flow path or when removed and undergoing cleaning.

3. In combination as set forth in claim 2, wherein said wire-form members comprise at least three wires of substantially the same diameter between said tubular and core members and spaced substantially equi-angularly about said longitudinal axis and each producing an interference fit in its position between said tubular and core members.

4. A cartridge unit for establishing controlled laminar-flow conditions along a relatively short length of a main fluid flow path having a relatively large cross-section, comprising a tubular member having a hollow interior cross-section about the same as that or a main fluid flow path into which it is to be inserted and further having provisions outside the interior thereof for removably locating and holding it in place along a main fluid flow path, and a plurality of elongated straight structural elements clustered together within said tubular member in a self-holding mechanically fitted relationship therewith and with one another which leaves a plurality of substantially straight and relatively small fluid flow channels therethrough, said elongated structural elements including a core member of relatively large cross-section coaxial and substantially coextensive with said tubular member and further including a plurality of wire-form members of relatively small cross-section fitted between said tubular and core members to produce said relatively small fluid flow channels in separated spaces therebetween, said channels all having effective length-to-diameter ratios which promote laminar flow and extending substantially fully the length of said tubular member, said channels being the only passageways open to fluid flow through said unit.

5. A cartridge unit as set forth in claim 4 wherein said tubular member has a substantially uniform-diameter interior and said core member is substantially concentric therewith and has a somewhat smaller uniform-diameter exterior, and wherein said wire-form members comprise at least three wires of substantially the same diameter between said tubular and core members and spaced substantially equi-angularly about the longitudinal axis of said tubular and core members and each producing an interference fit in its position between said tubular and core members, the interference fits resulting in said self-holding mechanically fitted relationship.

* * * * *